(12) United States Patent
Anzel et al.

(10) Patent No.: US 8,205,839 B2
(45) Date of Patent: Jun. 26, 2012

(54) METHODS AND APPARATUS FOR NODE-SYNCHRONOUS ECCENTRICITY CONTROL

(75) Inventors: Bernard M. Anzel, El Segundo, CA (US); Yiu-Hung M. Ho, Palos Verdes Estates, CA (US)

(73) Assignee: The Boeing Company, Chicago, IL (US)

( * ) Notice: Subject to any disclaimer, the term of this patent is extended or adjusted under 35 U.S.C. 154(b) by 1493 days.

(21) Appl. No.: 11/556,934

(22) Filed: Nov. 6, 2006

(65) Prior Publication Data

US 2008/0105788 A1    May 8, 2008

(51) Int. Cl.
*B64G 1/24* (2006.01)
*B64G 1/26* (2006.01)

(52) U.S. Cl. ........................ 244/164; 244/169

(58) Field of Classification Search .................. 244/164, 244/169; 701/13
See application file for complete search history.

(56) References Cited

U.S. PATENT DOCUMENTS

| | | | |
|---|---|---|---|
| 5,020,746 A * | 6/1991 | Anzel | 244/169 |
| 5,100,084 A | 3/1992 | Rahn et al. | |
| 5,124,925 A * | 6/1992 | Gamble et al. | 701/226 |
| 5,443,231 A * | 8/1995 | Anzel | 244/164 |
| 5,446,465 A * | 8/1995 | Diefes et al. | 342/357.08 |
| 5,669,585 A | 9/1997 | Castiel et al. | |
| 5,738,309 A | 4/1998 | Fowell | |
| 5,810,295 A | 9/1998 | Anzel | |
| 5,813,633 A | 9/1998 | Anzel | |
| 5,826,831 A | 10/1998 | Anzel | |
| 5,984,236 A | 11/1999 | Keitel et al. | |
| 6,015,116 A | 1/2000 | Anzel et al. | |
| 6,042,058 A | 3/2000 | Anzel | |
| 6,089,507 A * | 7/2000 | Parvez et al. | 244/158.8 |
| 6,135,394 A * | 10/2000 | Kamel et al. | 244/158.8 |
| 6,154,692 A | 11/2000 | Cielaszyk et al. | |
| 6,305,646 B1 * | 10/2001 | McAllister et al. | 244/158.8 |
| 6,341,749 B1 | 1/2002 | Ocampo | |
| 6,435,457 B1 | 8/2002 | Anzel | |
| 6,441,776 B1 | 8/2002 | Hein et al. | |
| 7,051,980 B2 | 5/2006 | Goodzeit et al. | |

OTHER PUBLICATIONS

International Search Report and Written Opinion for PCT/US2007/022322; Sep. 30, 2008; 12 pages.

* cited by examiner

*Primary Examiner* — Tien Dinh
(74) *Attorney, Agent, or Firm* — Armstrong Teasdale LLP

(57) ABSTRACT

A method for performing east-west station keeping for a satellite in an inclined synchronous orbit is described. The method includes averaging a value of a right ascension of the ascending node for an inclination vector associated with the satellite over a period of the control cycle, and managing corrections for the satellite such that an eccentricity vector, directed at perigee, is substantially collinear with the inclination vector.

22 Claims, 9 Drawing Sheets

METHODS AND APPARATUS FOR NODE-SYNCHRONOUS ECCENTRICITY CONTROL

BACKGROUND OF THE INVENTION

This invention relates generally to maintaining a position of orbiting satellites, and more specifically, to methods and systems for node-synchronous eccentricity control.

Spacecraft, such as satellites, are placed in Earth orbits for a variety of purposes, e.g., weather monitoring, scientific observations and commercial communications. Accordingly, they are maintained in a variety of attitudes and placed in a variety of orbits (e.g., low Earth orbit, transfer orbit, inclined synchronous orbit and geostationary orbit).

A spacecraft's orbital position is typically defined by the orbit's eccentricity, the inclination of the orbital plane from the Earth's equatorial plane, and the spacecraft's longitude. In a geostationary orbit, the spacecraft's orbital period matches the Earth's rotational period, the eccentricity is substantially zero and the spacecraft's orbital plane is substantially coplanar with the Earth's equatorial plane. The principal forces which disturb a spacecraft's position are generated by the gravity of the sun and the moon, the Earth's elliptical shape (triaxiality) and solar radiation pressure.

Inclined geosynchronous orbits, which are often used for communications to mobile customers are similar to those of geostationary orbits, except, they have a non-zero inclination typically in the range of three to seven degrees. Such satellites pass through the equatorial plane twice each day, once at an ascending node (the portion of the satellite orbit above an equatorial plane), and once at a descending node (the portion of the satellite orbit below an equatorial plane). The motion of satellites in inclined geosynchronous orbits is more complex in practice, due to orbit eccentricity, drift and other perturbing forces.

Due to satellite-to-satellite communication interference issues, satellites in geostationary orbits are assigned to geostationary "slots" that may vary from 0.2 degrees wide to 0.1 degrees wide in longitude near the equatorial plane. Despite their motion, interference is still a problem, and satellites in inclined geosynchronous orbits are also assigned to geostationary "slots" near the equatorial plane, with the same constraints between 0.1 degrees and 0.2 degrees in longitude. These longitude constraints are defined in a latitude range of between 0.1 degrees and 0.2 degrees in the equatorial zone. The constraints in latitude and longitude, are sometimes referred to as defining a "box".

The processes of maintaining a spacecraft's position with respect to the Earth and a position within the above described "slot" and/or "box" is generally referred to as station keeping. Station keeping may be facilitated with thrusters which are directed to generate forces through the spacecraft's center of mass. Attitude control is generally facilitated with momentum and/or reaction wheels whose momentum is periodically "dumped" when the same (or different) thrusters are directed to generate turning moments about the spacecraft's center of mass. Conventional thruster systems typically have sets of thrusters that are aligned in north-south and east-west directions. The north-south thrusters produce north-south velocity changes (ΔV) to control inclination. The east-west thrusters produce an east-west ΔV to control drift (change of longitude with time) and eccentricity.

The problem associated with maintaining a slot and/or box position is especially critical for current and future generation spacecraft. Such spacecraft often have large solar arrays and solar collectors, and therefore receive a strong solar force. This solar force requires a large steady state eccentricity when a single burn sun-synchronous perigee station keeping strategy is used. This eccentricity is difficult to control efficiently, even when a sun synchronous perigee station keeping strategy, which compresses eccentricity using double burn control maneuvers, is used. In some satellites, the east/west longitude excursion due to eccentricity can take up more than half the width of the slot. Other factors also consume slot width, including drift over the maneuver cycle, maneuver execution error, ΔV increments associated with momentum dumping disturbances, orbit determination error, and orbit propagation error.

Maintaining a longitudinal position of such a satellite in a synchronous inclined orbit is sometimes referred to as east-west station keeping. Maintaining the inclination of the orbit is sometimes referred to as north-south station keeping. Maintaining the longitudinal position of satellites in a synchronous inclined orbit has been previously performed based on the sun-synchronous strategy introduced above. The sun-synchronous strategy was developed for use with near stationary orbits having near zero inclination. However, north-south station keeping is not required for most mobile communications satellites, which typically have larger inclinations over their lifespan, for example, between three and seven degrees over the life of the satellite.

BRIEF DESCRIPTION OF THE INVENTION

In one aspect, a method for performing east-west station keeping for a satellite in an inclined synchronous orbit is provided. The method comprises averaging a value of a right ascension of the ascending node for an inclination vector directed at the ascending node and associated with the satellite over a period of the control cycle, and managing corrections for the satellite such that an eccentricity vector directed at perigee is substantially collinear with the inclination vector.

In another aspect, a satellite including at least one thruster device, a memory device, and a processing device is provided. The thruster device or devices are configured to provide corrections to an orbit of the satellite, the memory device includes inclination vector data associated with the satellite over a period of a control cycle for the satellite, and the processing device is configured to average a value of a right ascension of the ascending node of the orbit with the inclination vector data. The processing device is further configured to manage the at least one thruster device such that an eccentricity vector, directed at perigee of the orbit, is substantially collinear with the inclination vector.

In still another aspect, a method for removing variations of orbital eccentricity, which are normal to an inclination vector, from the orbit of a satellite is provided. The method comprises determining inclination data over the life of the satellite, and configuring a thruster mechanism for the satellite to maintain a substantial co-linearity between an eccentricity vector of the satellite, directed at perigee of the orbit, with an inclination vector, based on the inclination data, of the satellite.

In yet another aspect, a control system for maintaining a desired equatorial plane crossing position for a satellite is provided. The control system includes a memory device containing inclination vector data for a control cycle of the satellite, and a processing device. The processing device is configured to average a value of a right ascension of the ascending node of the satellite orbit from the inclination vector data. The processing device is further configured to manage one or more thrusters associated with the satellite such that an eccentricity vector of the satellite, directed at perigee of the orbit, is substantially collinear with the inclination vector for the satellite.

DETAILED DESCRIPTION OF THE INVENTION

Herein described are methods and systems for performing satellite station keeping for satellites in synchronous inclined orbits which results in a decrease in the fuel required to maintain the desired orbit as compared to the above indicated sun synchronous eccentricity control method. More specifically, an eccentricity vector is managed throughout the life of the satellite based on an inclination vector associated with the satellite. Management of the eccentricity vector provides an advantage over the standard sun-synchronous eccentricity control currently utilized in satellite station keeping, as longitude variation is minimized using much less thruster fuel. In one embodiment, the fuel savings is defined by the ratio, $2/\pi$, or about 0.6366, which is about a 36% decrease in fuel consumption over the sun-synchronous eccentricity control method.

Figure 1:
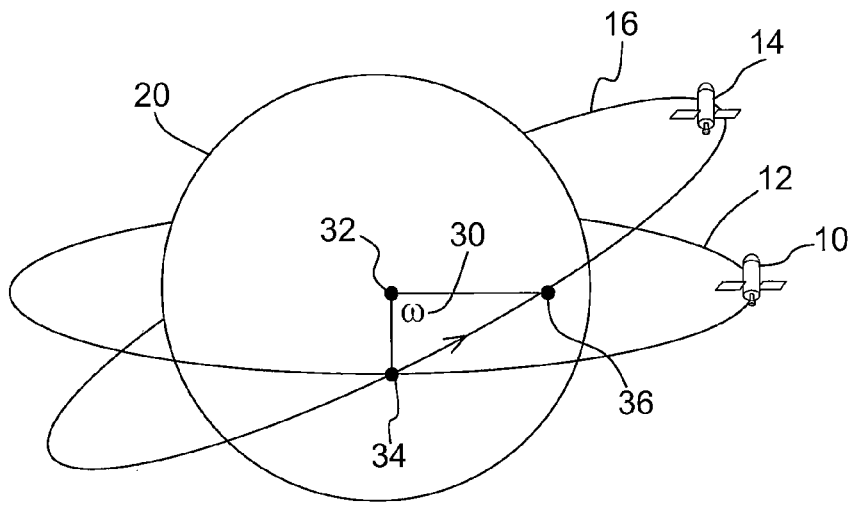
FIG. 1 is a diagram showing an equatorial view of a first spacecraft in a geostationary orbit and a second spacecraft in an inclined geosynchronous orbit.
Figure 2:
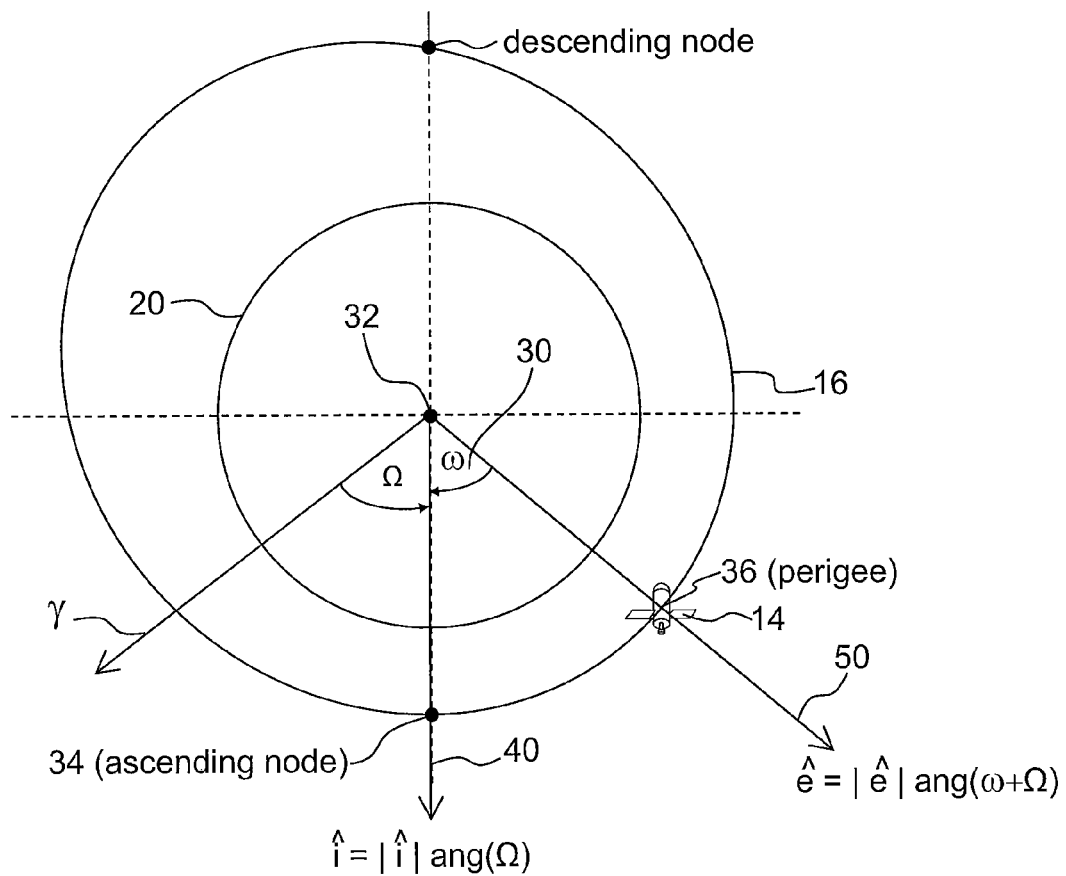
FIG. 2 is a polar view of the inclined geosynchronous orbit of the second spacecraft of FIG. 1.

FIG. 1 is a diagram illustrating a first spacecraft 10 in a geostationary orbit 12 and a second spacecraft 14 in an inclined geosynchronous orbit 16 with respect to earth 20, which is shown in an equatorial view. FIG. 2 illustrates a polar view of the orbit of satellite 14. The contribution of an orbital eccentricity to the longitudinal variation of the orbit at the equatorial plane of earth 20 is a function of the absolute value of the eccentricity of the orbit and an argument of perigee of the orbit. The argument of perigee is an angle 30 described by the earth center 32, an ascending node 34 (e.g., the crossing of the orbit through the equatorial plane from South to North), and a perigee position 36. The eccentricity vector is directed through the perigee of the orbit. The angle, $\Omega$, between the inertial reference, $\gamma$, and the ascending node locates the inclination vector 40, $\hat{\imath}$. Specifically, and ignoring second order parameters, the contribution is described by $|2 \times \hat{e} \times \sin(\omega)|$, where $\hat{e}$ is the eccentricity vector and $\omega$ is the argument of perigee (e.g., angle 30).

It is beneficial, and in certain applications required, to perform station keeping maneuvers so that satellite 14, which has an inclined geosynchronous orbit, remains within its assigned slot, or box, near the equatorial plane. However, such a satellite's orbit will vary at other times. The present invention achieves this result by using a station keeping method in which the argument of perigee, $\omega$, is caused to be substantially zero, based on one or more algorithms within the satellite, which, for example, may be stored in a memory and executed by a processing device. Such a combination, referred to herein as a satellite control system, substantially removes the variation of orbital eccentricity that is normal to the inclination vector. The method of the present invention utilizes two velocity increments ($\Delta V$) applied substantially 180 degrees apart along the orbit. These velocity increments, sometimes referred to as velocity changes, are applied to the satellite at substantially six hours before and six hours after the ascending node of the orbit.

For near stationary (e.g., slightly inclined) orbits and as described above, eccentricity control is based on the sun-synchronous method. This control strategy was originally conceived to point the eccentricity vector, $\hat{e}$, in the direction of the sun line, with the proper magnitude and phase, such that a single drift rate correcting velocity change, $\Delta V$, cyclically applied, would maintain an $\hat{e}$ that is substantially synchronous with the sun line. If the more or less constant $\hat{e}$ magnitude produces a longitude oscillation, or variation, that is too large (e.g., outside of the so-called longitude variation box), a magnitude of $\hat{e}$ has to be reduced. Reducing a magnitude of $\hat{e}$, generally necessitates two velocity changes, $\Delta V$s, that are applied approximately 180 degrees apart along the orbit and approximately six hours before and six hours after the sun line of the orbit. The total $\Delta V$ increases as the $\hat{e}$ magnitude is reduced.

The eccentricity vector 50, $\hat{e}$, is dependent upon the right ascension (RA) of perigee, ($\omega+\Omega$), where $\Omega$ is the right ascension of the orbit ascending node, and $\omega$ is the orbit argument of perigee. The argument of perigee, $\omega$, is not important in the sun-synchronous control of near stationary orbits. The fact that $\omega$ varies significantly over a year is due to the 360° motion of the sun right ascension. While this variation in $\omega$ produces variations in a latitude vs. longitude phase plane motion, it has minor impact on the goal of containing the phase plane motion inside, for example, a +/−0.05 degree latitude-longitude box, which is a requirement in at least some known satellite applications. However, for satellites in highly inclined synchronous orbits, variations in $\omega$ have a profound effect on the ability to contain motion within a defined latitude-longitude box.

Figure 3:
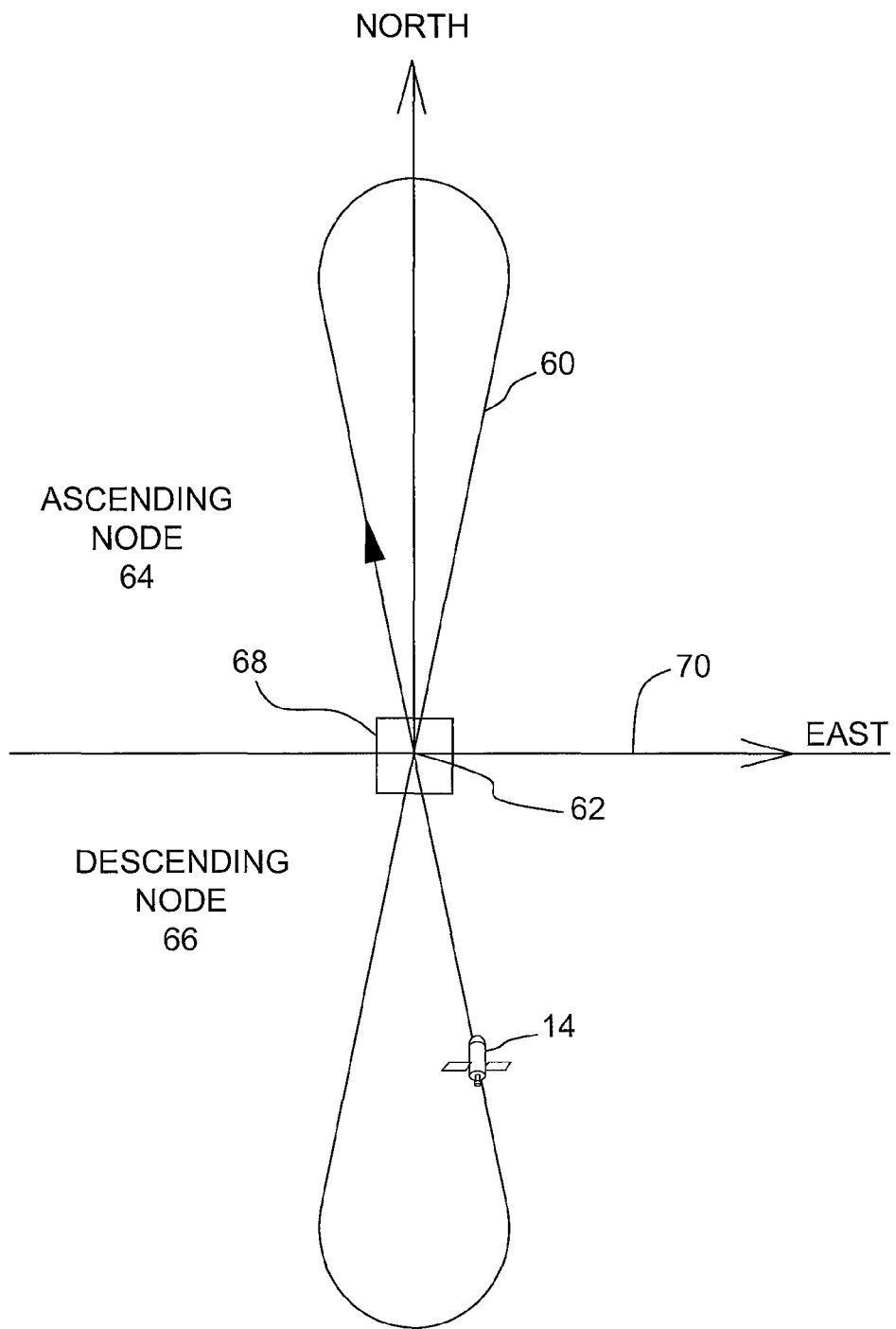
FIG. 3 is an illustration of a ground track associated with an inclined synchronous orbit.

To provide further illustration regarding synchronous orbits, FIG. 3 is a diagram depicting a ground track 60 of a typical inclined geosynchronous orbit 16 (also shown in FIG. 2). The center 62 of the "FIG. 8" depicted by the ground track 60 is at the equatorial plane of the earth 20 (shown in FIG. 2). The satellite 14 passes through the ground track center 62 twice each day, once at the ascending node 64 and once at the descending node 66. The motion of satellite 14 is more complex in practice, due to orbit eccentricity, drift and perturbing forces. Despite the motion of satellite 14, interference is still a problem, as described above, and satellite 14 is therefore still constrained to, for example, the +/−0.05 degree box 68 near the equatorial plane 70.

Figure 4:
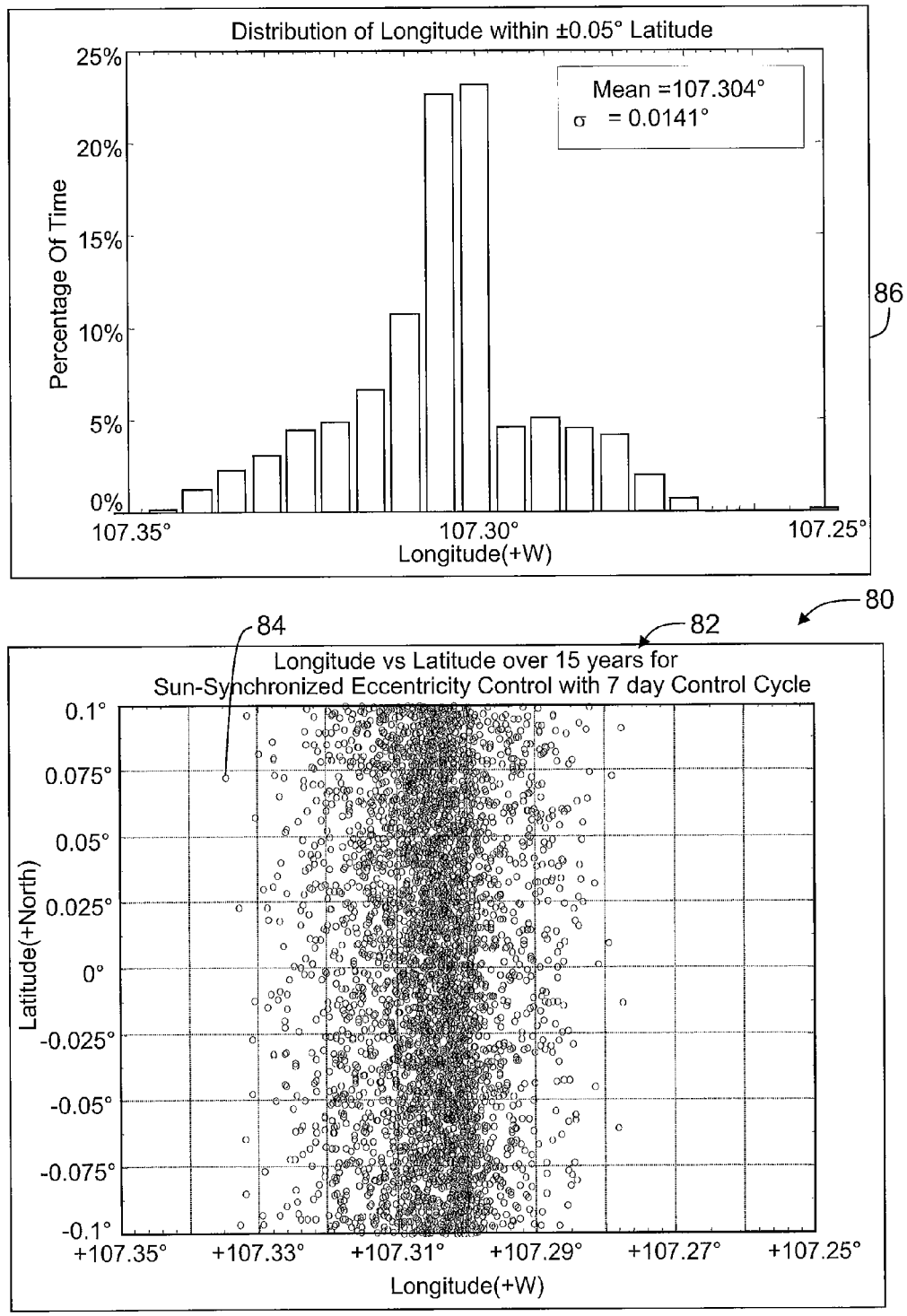
FIG. 4 includes a plurality of graphs illustrating an accuracy associated with a typical sun-synchronous eccentricity control method for a seven day control cycle.

FIG. 4 includes a plurality of graphs 80 illustrating an accuracy associated with a typical sun-synchronous eccentricity control method for a seven day control cycle. Graph 82 illustrates a position of a satellite as it passes through the box associated with the equatorial plane over a 15 year cycle. For example, marker 84 indicates the satellite had a position of about +107.335 degrees in longitude and about 0.075 degrees latitude. Overall graph 82 further illustrates a "box" that is +/−0.1 degree in latitude and +/−0.05 degrees in longitude. Graph 86 illustrates a distribution of the satellite equatorial plane crossing positions. As illustrated, using the sun-synchronous control method, the mean longitude of the equatorial plane crossing is about 107.304 degrees and the sigma is about 0.014 degrees, providing a three sigma from the mean values of about 0.042 degrees. As described further below with respect to FIG. 12, a minimum eccentricity three sigma value of about 0.026 degrees may be attained using sun synchronous eccentricity control, but requires a much greater fuel mass.

The longitude variation for most satellites in synchronous inclined orbits, using the sun-synchronous eccentricity control method, is constrained to +/−0.1 degree from station longitude. However, east-west station keeping control is more important for satellites in highly inclined synchronous orbits that must satisfy a +/−0.05 degree from station longitude constraint. Such satellites have an inclination of about three to seven degrees from the equatorial plane, but still must satisfy a +/−0.05 degree latitude-longitude box constraint. These satellites spend a very small fraction of each day within such a +/−0.05 degree latitude-longitude box. As a result, the longitude (E-W) variation need only be confined to within +/−0.05 degree of center only when the latitude (N-S) variation is within +/−0.05 degree of the equatorial plane.

For an unperturbed orbit with a synchronous period, the ascending and descending equator crossings occur at the same longitude if $\omega=0°$ (or $\omega=180°$), virtually independent of the $\hat{e}$ magnitude. The longitude difference between equator crossings is maximum if $\omega=90°$ (or $\omega=270°$), and is proportional to the magnitude of the eccentricity vector 50, $\hat{e}$ (shown in FIG. 2).

According to one embodiment of the present invention, a satellite in a highly inclined synchronous orbit does not require latitude (N-S) control due to the desire to conserve station keeping fuel. In the embodiment, only longitude (E-W) control is utilized. According to the embodiment, the satellite may be injected, for example, into an approximately six degree inclined orbit with an ascending node of about 335°. Over a period of 15 years, under the influence of the earth's oblateness and lunar/solar gravity, the ascending node of the inclination vector 40, $\hat{i}$, will monotonically increase approximately 60 degrees or an average of about four degrees per year. To maintain an orbit argument of perigee, $\omega$, of substantially zero degrees, the eccentricity vector 50, $\hat{e}$, is made to track the direction of the inclination vector 40, $\hat{i}$. This condition is sometimes referred to herein as maintaining a colinearity between the eccentricity vector 50 and the inclination vector 40.

By maintaining $\omega=0°$ (or 180°), at least theoretically, any contribution from eccentricity to the allowed +/−0.05° longitude slot is eliminated, resulting in very precise longitude control. For sun-synchronous eccentricity control to be so precise, the magnitude of the eccentricity vector would have to be minimized, thereby requiring maximum change in velocity, $\Delta V$.

When $\omega=0°$, and the eccentricity vector is non-zero, perigee is at the ascending node 64, and apogee is at the descending node 66. If the orbital period of satellite 14 is synchronous, that is, equal to a rotational period of the earth 20, the longitudes of ascending node 64 and descending node 66 are equal, as shown in FIG. 3, where the eccentricity vector is zero. In such a scenario, the time between apogee and perigee is one-half of the orbital period. As a result, equatorial plane crossings occur at the same longitude.

Figure 5:
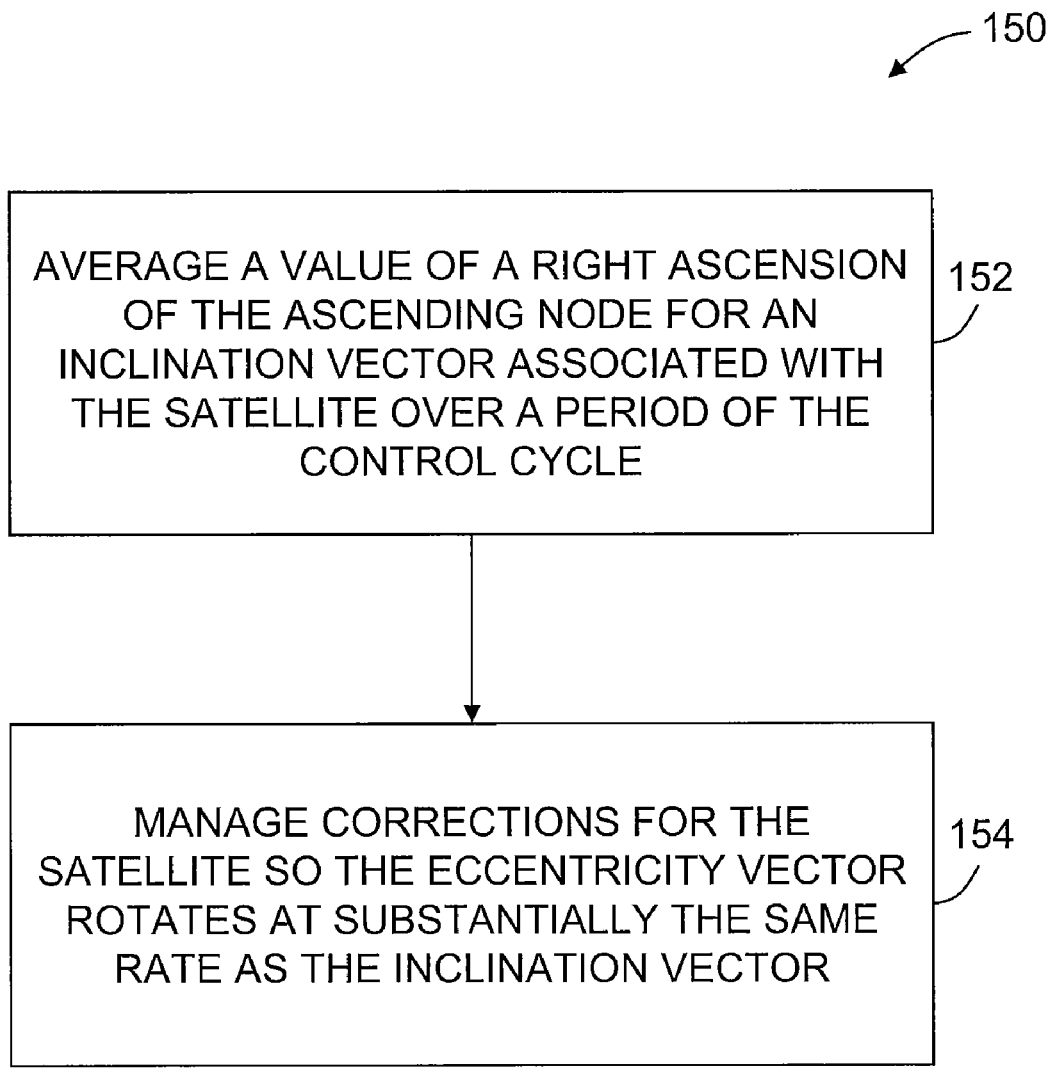
FIG. 5 is a flowchart illustrating node synchronous eccentricity control.

FIG. 5 is a flow diagram illustrating a process 150 for performing east-west station keeping for a satellite in an inclined synchronous orbit. In process 150, a value of a right ascension of the ascending node for an inclination vector associated with the satellite is averaged 152 over a period of the control cycle of the satellite and corrections for the satellite are managed 154 such that an eccentricity vector associated with the satellite rotates at substantially the same rate as the inclination vector.

To provide the same rate of rotation for these vectors, or stated differently, in order for the eccentricity vector, $\hat{e}$, to be made to track the inclination vector 40, $\hat{i}$, in one embodiment, a control program is provided which maintains the colinearity of the eccentricity vector with the inclination vector. Maintaining the colinearity of the eccentricity vector with the inclination vector is sometimes referred to as being node synchronous. As such, the methods and systems described herein are sometimes referred to as node-synchronous eccentricity control.

With respect to an orbit 16 of a satellite 14, solar forces provide the dominant perturbation of the eccentricity vector, $\hat{e}$. In the absence of mitigating maneuvers, the solar forces cause the eccentricity vector to trace out a circle in the phase plane (h1,k1). The period of this motion is one year and the radius of the circle is about 0.00054 radians for a solar radiation force (SRF) that is equal to 750 milli-newtons (mnt) and a satellite mass of about 3400 kilograms. The maximum eccentricity is minimized by properly initializing the satellite 14, which centers the circle at (0,0). The control program for satellite 14 includes two predominately tangential corrections, which are separated in right ascension, producing a change in the eccentricity vector, $\Delta\hat{e}$, normal to the direction which is colinear with the inclination vector 40, $\hat{i}$. The magnitude of $\Delta\hat{e}$ is ideally equal but opposite to the component of the eccentricity vector to be negated. The portion of the eccentricity vector that remains after the negation is colinear with the inclination vector and varies approximately sinusoidally with a period of one year and amplitude of 0.00054 (using example given above). As will be appreciated by those of skill in the art, a complete cancellation of the normal component is unrealizable, however, by performing daily corrections, the pointing variation can be reduced to about +/−0.5 degree. For a weekly correction frequency, the pointing variation is reduced to about +/−3.5 degrees.

As stated above the ascending node of the inclination vector advances at an average rate of about four degrees per year. The eccentricity vector can be made to track the inclination vector most closely by adjusting the magnitudes of the cyclic corrections in the eccentricity vector just enough so that, on the average, the eccentricity vector rotates at substantially the same rate as the inclination vector.

For comparison, a one week cyclic correction using sun-synchronous control minimum eccentricity, results in a longitude deviation between ascending and descending equator crossings which is roughly the same as with node synchronous eccentricity control. However, the total required change in velocity, $\Delta V$, for the node-synchronous eccentricity control method described herein is considerably less than that for the sun-synchronous control-minimum eccentricity. As mentioned above, the theoretical ratio in $\Delta V$ between the two methods, node synchronous eccentricity control (NSEC) and sun-synchronous eccentricity control (SSEC) is stated mathematically as ΔV(NSEC)/ΔV(SSEC)≈2/π, or about 0.6366.

Figure 6:
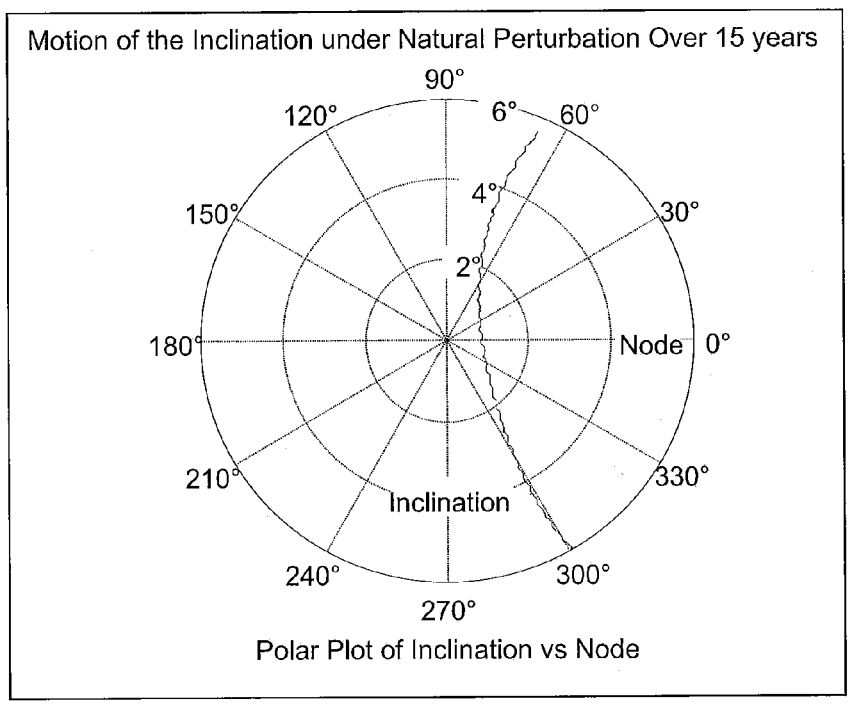
FIG. 6 illustrates the influence of the earth's oblateness and lunar/solar gravity on the inclination vector associated with a satellite over a period of 15 years.

An inclined synchronous orbit exists without North-South station keeping. Over a period of 15 years, under the influence of the earth's oblateness and lunar/solar gravity, the inclination vector 40, î, will vary with time as shown in FIG. 6. In order to produce the above described ω=0° condition, the eccentricity vector is controlled to track (remain synchronous with) the inclination vector. This is the basis for the above described node-synchronous eccentricity control methods, which in certain embodiments, includes computational algorithms within the satellite to provide the intended control.

Figure 7:
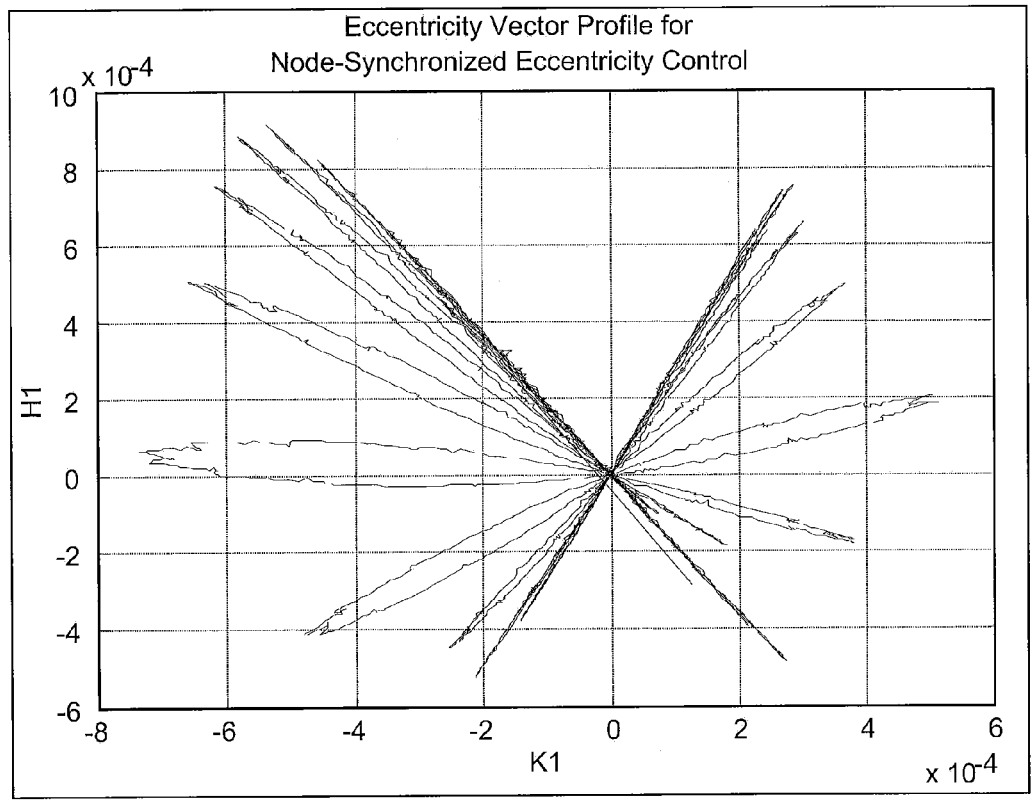
FIG. 7 illustrates an example of remaining eccentricity vector variation over the 15 year period.
Figure 8:
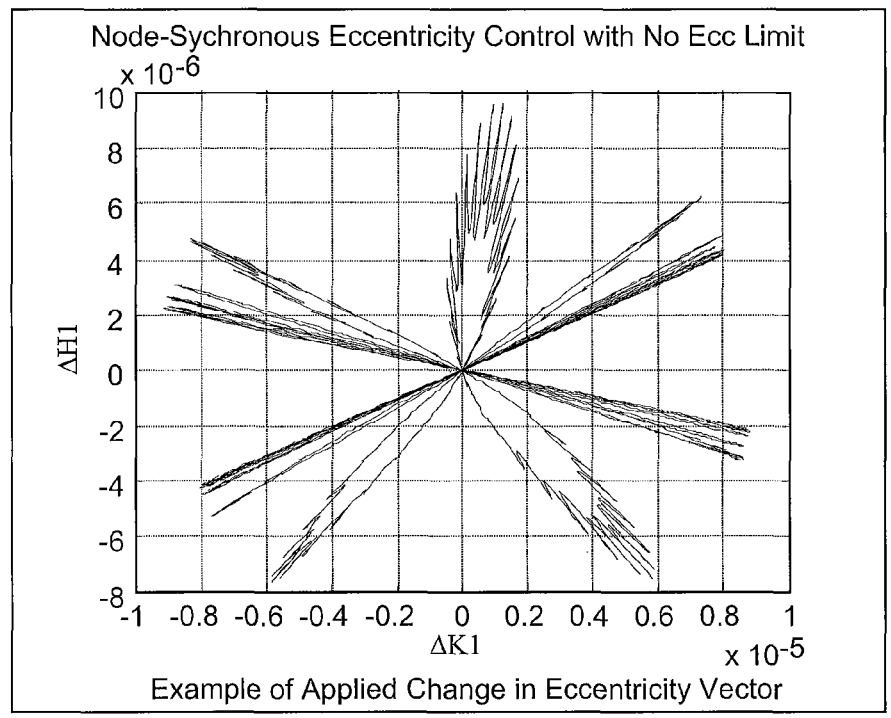
FIG. 8 illustrates the change in the eccentricity vector required in the control algorithm over the 15 year period.
Figure 9:
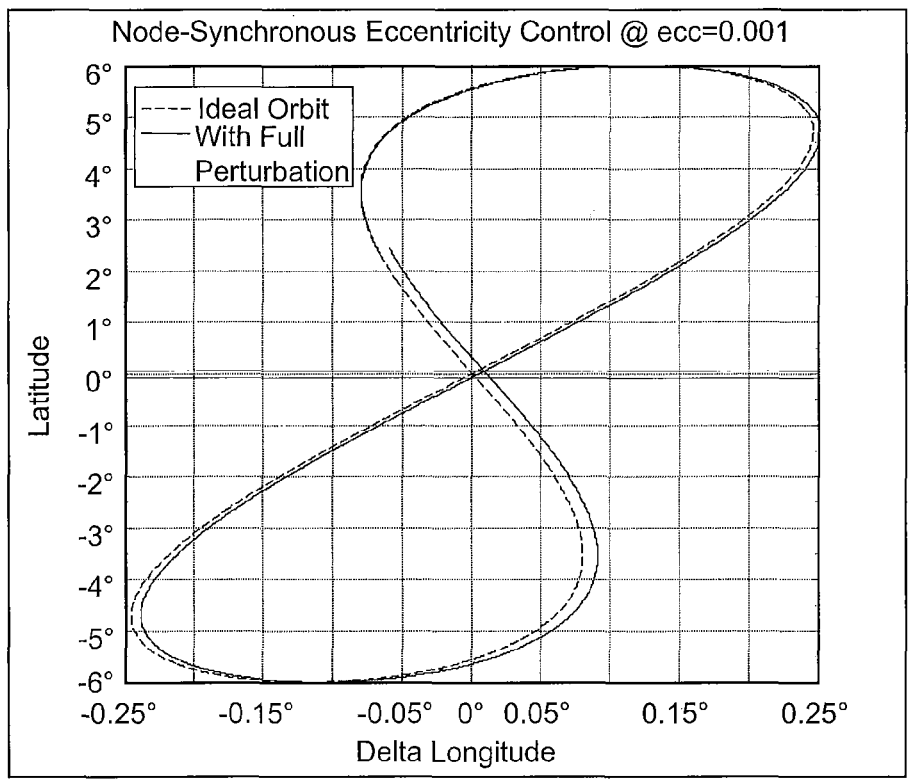
FIG. 9 is an illustration of a ground track associated with an inclined synchronous orbit.
Figure 10:
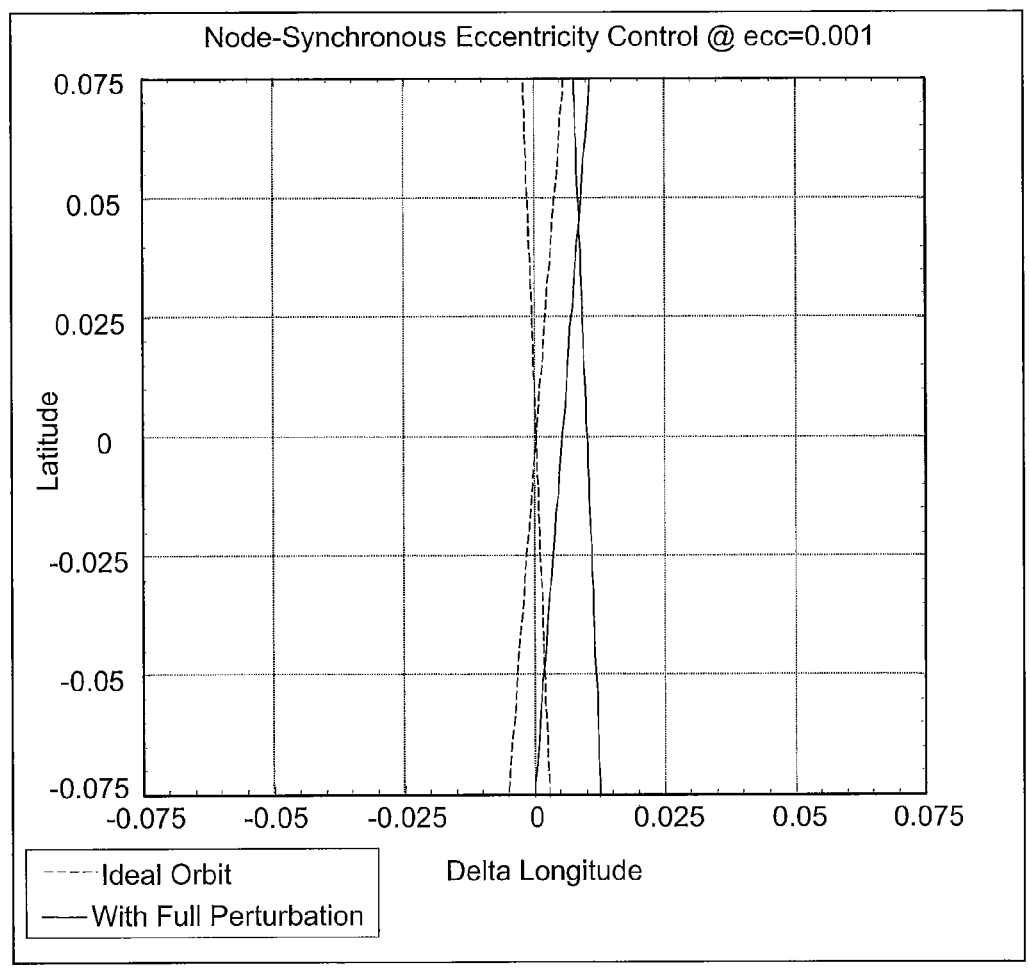
FIG. 10 is a magnified representation of a +/−0.05 degree latitude and longitude box associated with node synchronous eccentricity control.

Input to the computational algorithms specify the known value of the inclination vector right ascension of the ascending node averaged over the period of the satellite control cycle. The change in the eccentricity vector during this period (without considering maneuvers) is computed from a perturbation model. Only the normal component change in the eccentricity is considered for correction. Using this method, two corrections are usually necessary. Specifically, the thruster firing durations and locations along the orbit are easily computed and they occur about six hours before and six hours after the node crossing time. Some variation in this node crossing time occurs if the thrusters do not provide purely tangential ΔVs (i.e., the thruster geometry may include residual ΔV coupling). The remaining variation maximums in the eccentricity vector are minimized by proper orbit initialization. However, to first order, this does not affect the result, which is to achieve ω≈0 and thus virtually eliminate the effect of eccentricity on longitude variation when the absolute value of the latitude is less than 0.05 degrees. An example of the remaining eccentricity vector variation over the 15 year cycle is shown in FIG. 7. FIG. 8 illustrates the change in the eccentricity vector required in the control algorithm over the same 15 years where H1 and K1 are Cartesian coordinates of the eccentricity vector. FIG. 9 is an illustration of a "FIG. 8" ground track associated with an inclined synchronous orbit where the eccentricity vector is non-zero. FIG. 10 is a magnified representation of the 0.1 degree latitude and longitude box (±0.05 degree).

Figure 11:
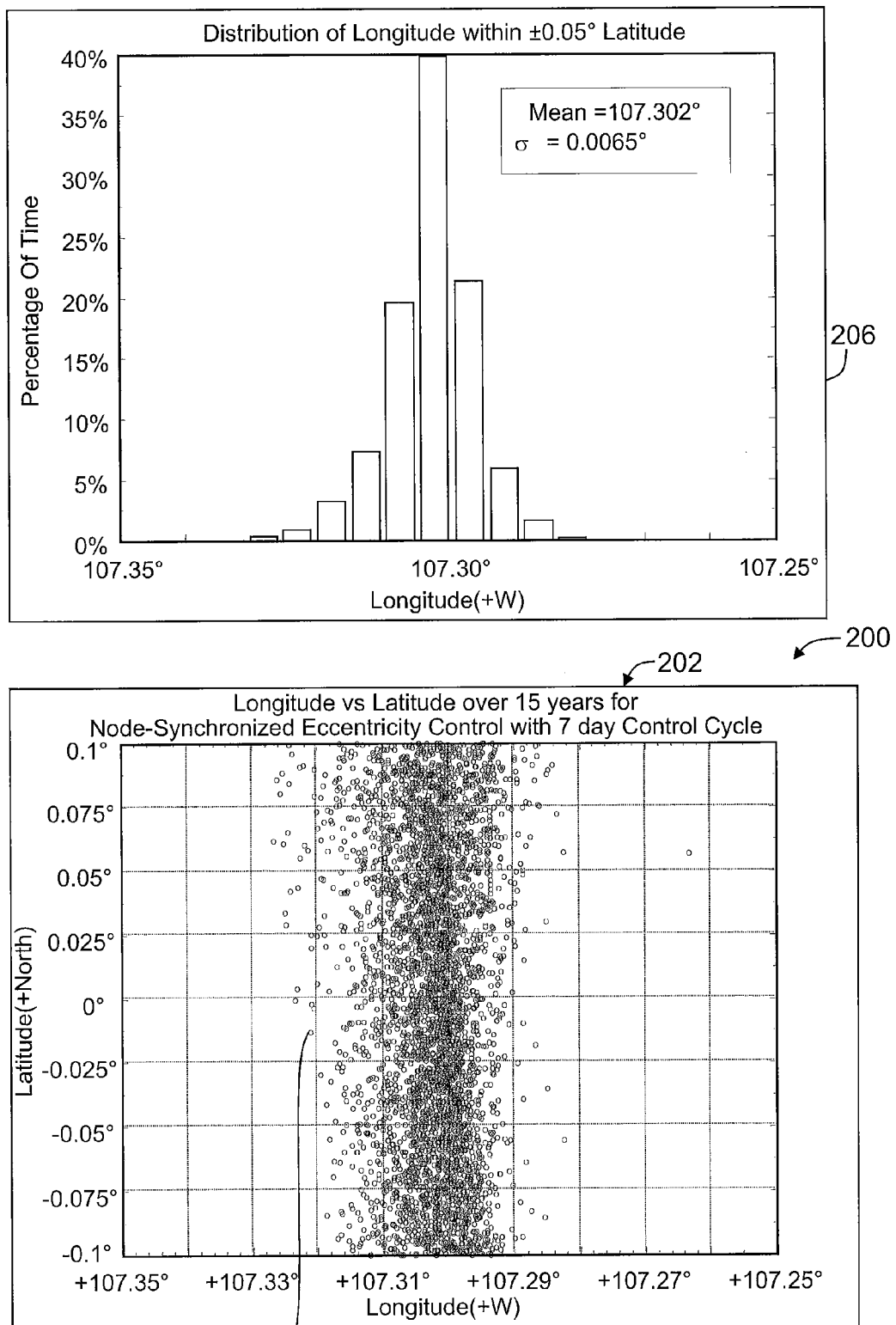
FIG. 11 includes a plurality of graphs illustrating an accuracy associated with the node-synchronous eccentricity control method and a seven day control cycle.

FIG. 11 includes a plurality of graphs 200 illustrating the improved accuracy associated with the above described node-synchronous eccentricity control methods as compared to the sun-synchronous eccentricity control method over a seven day control cycle. Graph 202 illustrates positions of a satellite as it passes through the box associated with the equatorial plane over a 15 year cycle. For example, marker 204 indicates the satellite had a position of about 107.32 degrees in longitude and about −0.0125 degrees in latitude. Overall graph 202 further illustrates a "box" that is +/−0.1 degree in latitude and +/−0.05 degrees in longitude. Graph 206 illustrates a distribution of the satellite equatorial plane crossing positions. As illustrated, using the node-synchronous eccentricity control method, the mean longitude of the equatorial plane crossing is about 107.302 degrees and the sigma is about 0.0065 degrees, an improvement over the sun-synchronous control method, providing a three sigma value of 0.0195 degrees.

Figure 12:
FIG. 12 is a chart illustrating fuel requirements and three sigma values for sun synchronous eccentricity control and node synchronous eccentricity control.

FIG. 12 is a chart 250 that summarizes an amount of fuel utilized and the resulting longitudinal control for the node synchronous eccentricity control method described herein, for a typical sun synchronous eccentricity control method and for a sun synchronous control method that provides a minimal eccentricity in the orbit of a satellite. More specifically, for a solar radiation force of about 750 milli-newtons, and a spacecraft mass of about 3400 kilograms, the required tangential component velocity changes (ΔVs) utilizing minimum eccentricity sun-synchronous eccentricity control is about 80.8 meters per second (about 5.2 meters per second per year), about 63.8 meters per second (about 4.2 meters per second per year) utilizing a typical sun synchronous eccentricity control method, and about 54.0 meters per second (about 3.5 meters per second per year) using the node synchronous eccentricity control methods described herein. This difference increases the station keeping life by about 57 percent. More directly, the amount of thruster fuel to provide a station keeping life of about 15.25 years using a typical sun-synchronous eccentricity control methods results in a station keeping life of about 23.5 years using node synchronous eccentricity control.

In one application and stated differently, for a satellite lifespan of about 15 years, it is believed that station keeping using typical sun-synchronous eccentricity control will require about 111.7 kilograms of thruster fuel (141.8 kilograms to maintain a minimum eccentricity), while station keeping using node synchronous eccentricity control will require about 94 kilograms of fuel, while maintaining a Δ longitude, for a seven day correction cycle, of about 0.020 degree as compared to 0.042 degree for a typical sun-synchronous eccentricity control method. While utilization of a minimum eccentricity sun synchronous control method can maintain a three sigma Δ longitude of about 0.026 degrees, about 37% more fuel is required than is required to maintain a three sigma Δ longitude of about 0.020 degrees using node synchronous eccentricity control.

As is evidenced by the thruster fuel savings, the above described methods are desirable for use by entities that operate, design or manufactures satellites for inclined synchronous orbits as the significant fuel savings allows more on-station life, more payload capability, or a combination of the two. For example, for a GeoMobile (GEM) spacecraft, the node synchronous eccentricity control method translates primarily into higher dry mass capability for the spacecraft, which is critical since GEM typically do not have XIPS orbit raising capability. As the geo-mobile market is typically serviced by very large spacecraft, mass is critical. The methods and systems described herein are valuable to this market as they represent a significant improvement over currently utilized station keeping methods. The end results of utilizing such systems and methods include, a savings in mass associated with the spacecraft, savings and potentially millions of dollars in savings due to launch vehicle compatibility.

While the invention has been described in terms of various specific embodiments, those skilled in the art will recognize that the invention can be practiced with modification within the spirit and scope of the claims.

What is claimed is:

1. A method for performing east-west station keeping for a satellite in an inclined synchronous orbit, said method comprising:
   averaging a value of a right ascension of the ascending node for an inclination vector associated with the satellite over a period of the control cycle; and
   managing two predominately tangential corrections for the satellite such that an eccentricity vector, directed at perigee, is substantially collinear with and substantially tracks the inclination vector such that latitude control of the satellite is not required to maintain the satellite in the inclined synchronous orbit.

2. A method according to claim 1 further comprising:
   minimizing a maximum variation of the eccentricity vector based on an orbit initialization;
   averaging the inclination vector over a period of a control cycle of the satellite; and managing corrections for the satellite such that the eccentricity vector rotates at substantially the same rate as the inclination vector.

3. A method according to claim 1 wherein averaging a value of a right ascension of the ascending node for an inclination vector comprises averaging the value based on at least one of an influence based on an oblateness of the earth and lunar and solar gravity on the inclination vector.

4. A method according to claim 1 wherein managing two predominately tangential corrections for the satellite comprises:
   computing the eccentricity vector over the period of the control cycle from a perturbation model; and
   computing corrections for a normal component of the eccentricity vector by computing thruster firing durations and locations along the orbit based on a configuration of the thrusters.

5. A method according to claim 1 wherein managing two predominately tangential corrections for the satellite comprises utilizing two velocity changes, substantially 180 degrees apart along the orbit, one velocity change substantially six hours prior to an ascending node of the orbit, and one velocity change substantially six hours after the ascending node of the orbit.

6. A method according to claim 1 wherein managing two predominately tangential corrections for the satellite comprises removing the variations of orbital eccentricity which are normal to the inclination vector.

7. A method according to claim 6 wherein removing the variations of orbital eccentricity from the orbit comprises causing an argument of perigee for the eccentricity vector to be substantially zero, based upon one or more algorithms within the satellite.

8. A satellite comprising:
   at least one pair of thruster devices configured to provide predominately tangential east-west station keeping corrections to an orbit of said satellite;
   a memory device comprising inclination vector data associated with said satellite over a period of a control cycle for said satellite; and
   a processing device configured to average a value of a right ascension of the ascending node of the orbit with the inclination vector data and manage said at least one thruster device such that an eccentricity vector, directed at perigee of the orbit, is substantially collinear with and substantially tracks the inclination vector so that latitude control of the satellite is not required and only longitudinal control maintains the satellite in an inclined synchronous orbit.

9. A satellite according to claim 8 wherein to average a value of a right ascension of the ascending node of the orbit with the inclination vector data, said processing device is configured to average the value based on at least one of an influence based on an oblateness of the earth and lunar and solar gravity on the inclination vector.

10. A satellite according to claim 8 wherein to manage said at least one pair of thruster devices, said processing device is configured to:
    compute the eccentricity vector over the period of the control cycle from a perturbation model; and
    compute corrections for a normal component of the eccentricity vector by computing firing durations and locations along the orbit for said at least one pair of thruster device devices based on a configuration of said at least one pair of thruster devices.

11. A satellite according to claim 8 wherein said processing device is configured to utilize said at least one pair of thruster devices to cause two velocity changes of said satellite, the velocity changes substantially 180 degrees apart along the orbit, one velocity change substantially six hours prior to an ascending node of the orbit, and one velocity change substantially six hours after the ascending node of the orbit.

12. A satellite according to claim 8 wherein said processing device and said memory device are configured to utilize said at least one pair of thruster devices to remove the variations of orbital eccentricity which are normal to the inclination vector.

13. A satellite according to claim 12 wherein said processing device and said memory device are configured to cause an argument of perigee for the eccentricity vector of said satellite to be substantially zero.

14. A method for removing variations of orbital eccentricity, which are normal to an inclination vector, from the orbit of a satellite, said method comprising:
    determining inclination data over a predicted lifetime of the satellite;
    configuring a predominately tangential thruster mechanism for the satellite to maintain a substantial co-linearity between an eccentricity vector of the satellite, directed at perigee of the orbit, with an inclination vector, based on the inclination data over the predicted lifetime of the satellite; and
    tracking by the eccentricity vector of the satellite the inclination vector so that latitude control of the satellite is not required to maintain the satellite in an inclined synchronous orbit.

15. A method according to claim 14 wherein configuring a predominately tangential thruster mechanism for the satellite comprises:
    providing a first velocity change substantially six hours prior to an ascending node of the orbit; and
    providing a second velocity change substantially six hours after the ascending node of the orbit, the first and second velocity changes to maintain the substantial collinearity between the eccentricity vector and the inclination vector so that only longitudinal control of the satellite maintains the satellite in the inclined synchronous orbit.

16. A method according to claim 15 wherein configuring a predominately tangential thruster mechanism for the satellite comprises causing an argument of perigee for the eccentricity vector to be substantially zero through the velocity changes.

17. A control system for maintaining a desired equatorial plane crossing position for a satellite, said control system comprising:
    a memory device containing inclination vector data for a control cycle of the satellite; and
    a processing device configured to average a value of a right ascension of the ascending node of the satellite orbit with the inclination vector data, said processing device further configured to manage one or more predominately tangential thrusters associated with the satellite such that an eccentricity vector of the satellite, directed at perigee of the orbit, is substantially collinear with and tracks the inclination vector for the satellite without the need for latitude control of the satellite to maintain the satellite in an inclined synchronous orbit.

18. A control system according to claim 17 wherein to average a value of a right ascension of the ascending node of the orbit with the inclination vector data, said processing device is configured to average the value based on at least one of an influence based on an oblateness of the earth and lunar and solar gravity on the inclination vector.

19. A control system according to claim 17 wherein said processing device is configured to:

compute the eccentricity vector over the period of the control cycle from a perturbation model; and compute corrections for a normal component of the eccentricity vector by computing firing durations and locations along the orbit for one or more predominately tangential orbit correction devices.

20. A control system according to claim 17 wherein said processing device is configured to initiate two velocity changes for a satellite, the velocity changes substantially 180 degrees apart along the orbit, one velocity change substantially six hours prior to an ascending node of the orbit, and one velocity change substantially six hours after the ascending node of the orbit.

21. A control system according to claim 17 wherein said processing device and said memory device are configured to utilize one or more predominately tangential orbit correction devices to remove contributions of orbital eccentricity from the orbit of a satellite.

22. A control system according to claim 21 wherein said processing device and said memory device are configured to cause an argument of perigee for the eccentricity vector of a satellite to be zero.

* * * * *